United States Patent [19]
Rickard

[11] Patent Number: 5,841,408
[45] Date of Patent: Nov. 24, 1998

[54] HEAD-UP DISPLAYS

[75] Inventor: Stephen Rickard, Ruthin Clwyd, United Kingdom

[73] Assignee: Pilkington P.E. Limited, St. Asaph, United Kingdom

[21] Appl. No.: 540,461

[22] Filed: Oct. 10, 1995

[30] Foreign Application Priority Data

Oct. 8, 1994 [GB] United Kingdom .................... 9420315

[51] Int. Cl.⁶ ......................................................... G09G 5/00
[52] U.S. Cl. ................................................. 345/7; 359/362
[58] Field of Search ....................... 345/7, 8, 9; 340/980; 250/221; 359/630, 632; 349/11

[56] References Cited

U.S. PATENT DOCUMENTS

| | | | |
|---|---|---|---|
| 3,620,601 | 11/1971 | Waghorn | 359/360 |
| 3,945,716 | 3/1976 | Kinder | 345/7 |
| 4,664,475 | 5/1987 | Ferrer | 350/174 |
| 4,736,097 | 4/1988 | Philipp | 250/221 |
| 4,749,256 | 6/1988 | Bell et al. | 359/362 |
| 5,028,119 | 7/1991 | Hegg et al. | 359/632 |
| 5,065,976 | 11/1991 | Woody | 248/549 |
| 5,381,267 | 1/1995 | Woody | 359/362 |
| 5,457,575 | 10/1995 | Groves et al. | 359/632 |
| 5,553,328 | 9/1996 | Hall et al. | 359/632 |

FOREIGN PATENT DOCUMENTS

| | | | |
|---|---|---|---|
| 1270828 | 6/1968 | Germany | 359/630 |
| 1132769 | 11/1968 | United Kingdom . | |
| 1387812 | 5/1972 | United Kingdom | F16H 25/24 |
| 2009071 | 6/1979 | United Kingdom . | |
| 2154757 | 9/1985 | United Kingdom . | |
| 2280041 | 1/1995 | United Kingdom . | |
| WO92/90456 | 6/1992 | WIPO | B60R 19/40 |

*Primary Examiner*—Amare Mengistu
*Attorney, Agent, or Firm*—Young & Basile, P.C.

[57] ABSTRACT

A head-up display system comprising an optical combiner 5 for positioning in front of a pilot's head, in-line with the pilot's normal line of sight and in a plane substantially transverse to said line of sight. Sensor means, comprising a pair of optical sensors 9,10, is arranged to detect motion of the pilot's head towards the combiner 5 and to cause a trigger signal to be generated, prior to impact between the pilot's head and the combiner, if the velocity of said motion exceeds a threshold velocity. Retraction means 7 are coupled to the sensor means for receiving therefrom said trigger signal and are arranged, in response to receipt of said trigger signal, to retract the combiner 5 out of the trajectory of the pilot's head prior to impact between the head and the combiner.

6 Claims, 2 Drawing Sheets

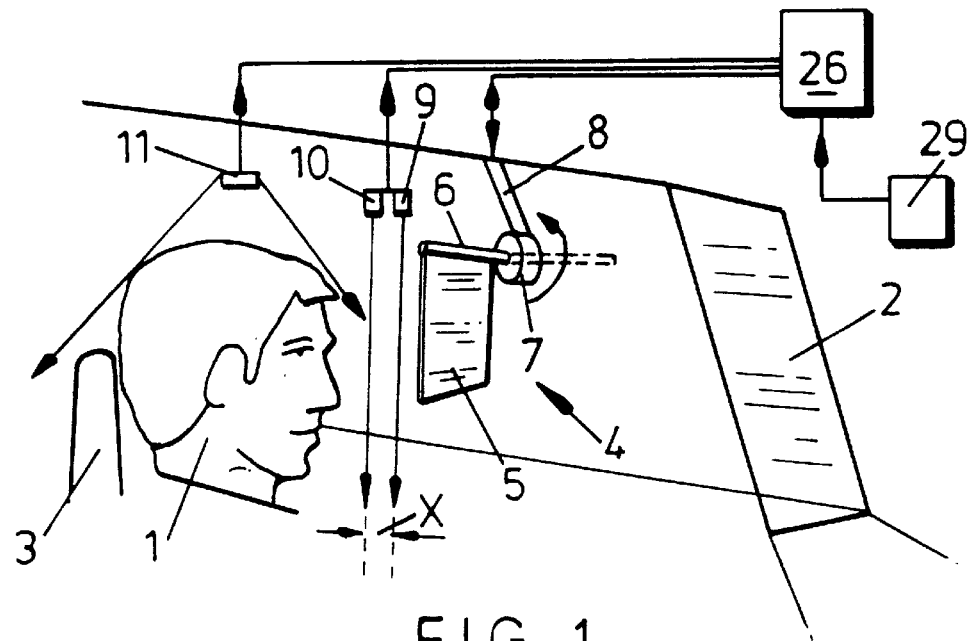
FIG. 1
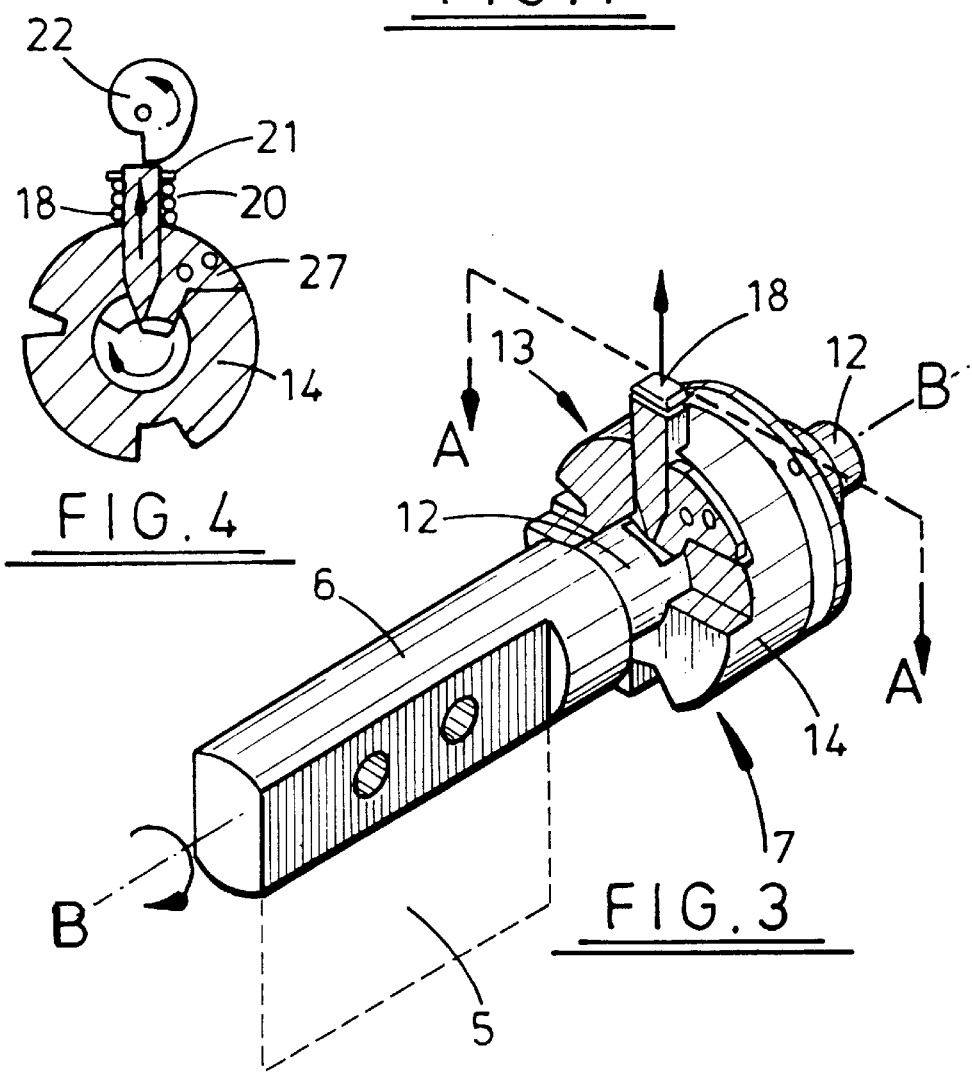
FIG. 4
FIG. 3

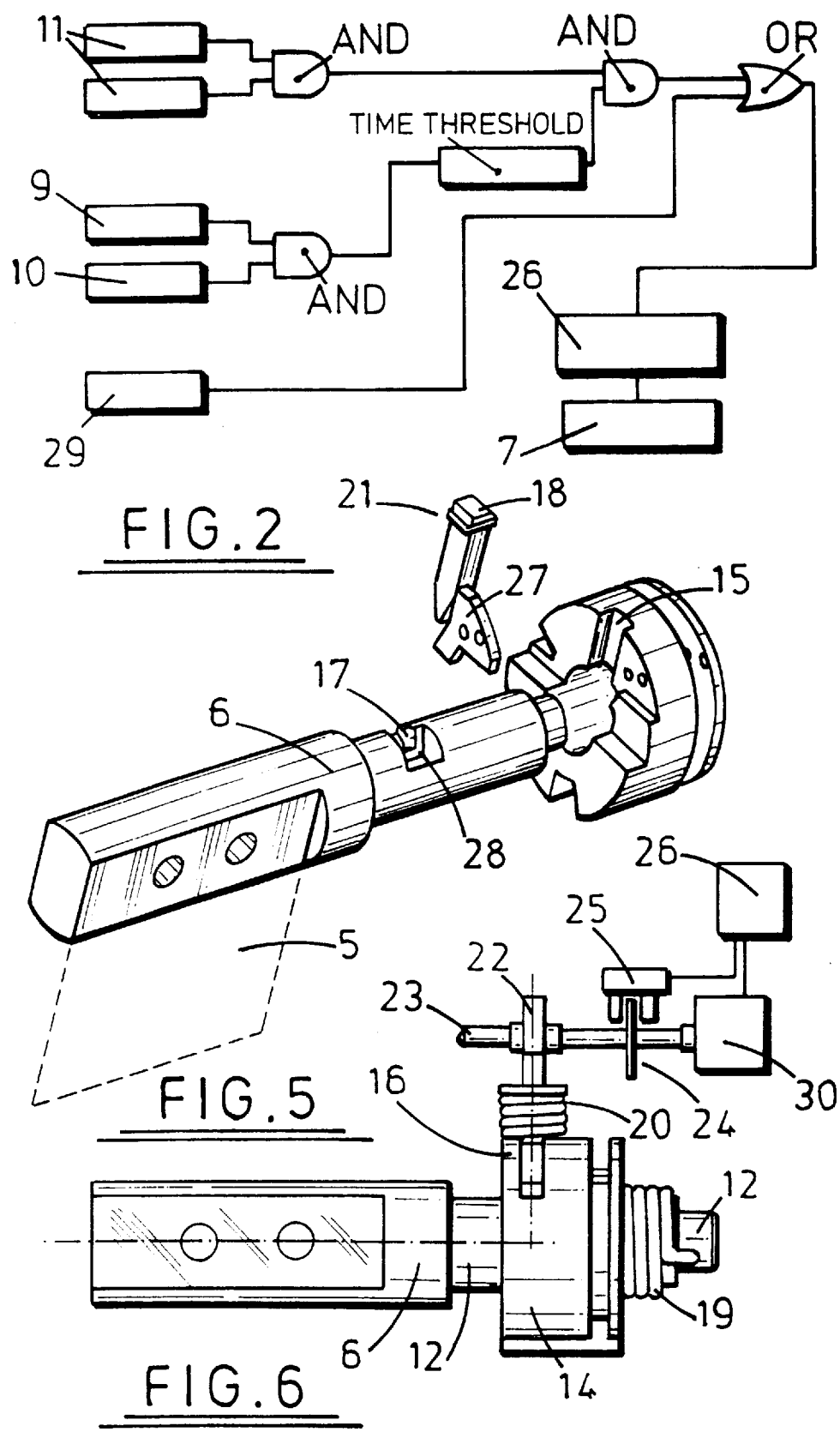

HEAD-UP DISPLAYS

The present invention relates to aircraft head-up displays and in particular to aircraft head-up displays comprising means for rapidly retracting a combiner of the head-up display upon rapid deceleration of an aircraft if impact between the combiner and the pilots head is imminent.

Head-up displays (HUD) are commonly used in military aircraft, and also now in civil aircraft, to convey information directly into the line of sight of a pilot without distracting the pilot from the outside view. The combiner generally comprises a transparent glass or plastic sheet onto which relevant aircraft information is projected or otherwise transmitted.

In the event of rapid deceleration of a plane, for example as a result of an impact, in order to prevent injury to the pilot's head it is necessary to allow the combiner to move out of the trajectory of the pilots head. Existing systems for enabling the retraction of the combiner require the combiner to be first struck by the pilot's head. Initial impact between the pilots head and the combiner provides a force sufficient to activate a release mechanism which enables the combiner to swing backwards under the application of further force by the head (or by connected springs). One such system comprises a combiner hingeably attached to an upper, horizontally extending, arm so that the combiner can swing up and away following impact by the pilot's head. The combiner is prevented from rotating about the arm, away from its normal lowered position, by a locking mechanism joining the combiner to the arm. The locking mechanism comprises a number of spring mounted ball bearings coupled to the combiner which engage respective detents in a portion of the arm. A threshold force is required to dislocate the ball bearings from the detents and to thereby release the combiner.

A problem with conventional break-away systems is that the force required in order to release the locking mechanism may be significant and can be equivalent to the pilot running into a glass sheet at full speed (e.g. at over 27 km/h). There is therefore a significant risk of injury to the pilot's head, and in particular to the bridge of the pilot's nose with existing systems. A further disadvantage of conventional systems is that the complex mechanical break-away mechanisms may be damaged by the impact force, requiring the replacement of expensive mechanical components.

It is an object of the present invention to provide a head-up display break-away mechanism which eliminates the need for impact between a pilot's head and a combiner and which is mechanically simpler and less prone to damage than existing systems.

According to a first aspect of the present invention there is provided a head-up display comprising:

a combiner for positioning in front of a pilot's head in-line with the pilot's normal line of sight and in a plane substantially transverse to said line of sight;

sensor means for detecting motion of the pilot's head towards the combiner and for generating a trigger signal, prior to impact between the pilot's head and the combiner, if the velocity of said motion exceeds a threshold velocity;

retraction means coupled to the sensor means for receiving therefrom said trigger signal and, in response to receipt of said trigger signal, for retracting the combiner out of the trajectory of the pilot's head prior to impact between the head and the combiner.

Preferably the sensor means comprises first and second sensors spaced apart from one another between the normal position of the pilot's head and the combiner and arranged to be sequentially activated by motion of the pilot's head towards the combiner, and means for calculating, from the time difference between the activation of the two sensors, the velocity of the pilot's head towards the combiner. The sensor means may also comprise an additional sensor arrangement for detecting movement of the pilot's head out of the position which it normally occupies, said trigger signal only being generated if both the pilot's head is detected as lying outside the normal position and the necessary threshold velocity condition is satisfied. The normal head position may be defined as a fixed distance behind and a fixed distance in front of a point above the pilot's chair. In this way, accidental retraction of the combiner when an object other than the pilot's head approaches the combiner is substantially prevented.

The head-up display preferably comprises, or is coupled to, an accelerometer for detecting deceleration of the aircraft. If the aircraft decelerates at a rate in excess of a threshold value, a trigger signal is transmitted to the retraction means to cause retraction of the combiner.

Preferably the head-up display comprises means for mounting the combiner relative to the cockpit so that said retraction occurs by way of rotation of the combiner about an upper horizontal axis. In a preferred embodiment, the retraction means comprises an arm coupled to the combiner, the arm rotatably engaging a collar or collar portion fixed relative to the cockpit to enable the combiner to be rotated about the longitudinal axis of the arm.

The retraction means may further comprise bias means acting in a sense tending to rotate the arm to cause said retraction of the combiner, and a releasable locking mechanism, responsive to said trigger signal, for retaining the arm and the attached combiner in the normal operating position against the action of the bias means. The bias may comprise a torsion spring coupled between the arm and the collar/collar portion. Alternatively, during deceleration of an aircraft the bias force may be provided by inertia.

The locking mechanism may comprise a locking pin extending through the collar/collar portion to engage a catch, for example a recess, in the arm to lock the arm and the combiner relative to the collar/collar portion and the cockpit and a release mechanism for raising the pin through the collar/collar portion to disengage the pin from the arm and to thereby allow the combiner to rotate under the action of the bias means. The release mechanism may comprise spring means acting on the locking pin in a sense tending to disengage it from the arm and a cam acting on an upper surface of the pin. In a first position the cam counteracts the force of the spring means and maintains the pin in engagement with the arm. In a second position, the cam means releases the pin allowing it to move upwards and to disengage from the arm. The cam may be moved between said first and second positions by means of a rotary motor responsive to said trigger signal.

Preferably the head-up display is arranged so that the combiner is withdrawn from out of the trajectory of the pilots head within 100 mS, and more preferably within 50 mS, of the pilots head achieving said threshold velocity and/or of the aircraft decelerating at a rate in excess of a predefined threshold.

For a better understanding of the present invention and in order to show how the same may be carried into effect reference will now be made, by way of example, to the accompanying drawings in which:

FIG. 1 shows a head-up display mounted in front of a pilot's head and incorporating a break-away system for the combiner;

FIG. 2 shows a logic circuit illustrating the conditional operation of the break-away system of FIG. 1;

FIG. 3 shows in more detail the break-away system of the head-up display of FIG. 1;

FIG. 4 shows a cross-sectional view of the break-away system of FIG. 3 taken in the direction A—A;

FIG. 5 shows a view of the break-away system of FIG. 3 in disassembled form; and FIG. 6 shows a front cross-sectional view of the break-away system of FIG. 3 taken through an arm axis B—B.

There is shown in FIG. 1 a typical aircraft cockpit set-up in which a pilot 1 is seated in front of front windscreen 2, with his head resting upon a headrest 3. A head-up display (HUD), indicated generally by reference numeral 4, is provided in its in-use position between the pilot's head and the windscreen in the pilot's field-of-view and provides aircraft information to the pilot without requiring him to move his head to any significant extent. The HUD comprises a transparent glass or plastic combiner 5 onto which is projected in a known manner relevant aircraft information. The combiner 5 is attached along its upper edge to an arm 6, the arm in turn being engaged by a retraction mechanism 7. The retraction mechanism is attached to the ceiling of the cockpit, or to any other convenient fixed location in the cockpit, by a clamping member 8.

In order to detect movement of the pilot's head towards the combiner 5, a pair of infra-red optical sensors 9 and 10 are provided, coupled to a location below the ceiling. The sensors generate respective infra-red beams which extend across respective first and second planes lying between the position which the pilot's head normally adopts and the in-use position of the combiner 5. The first and second planes are spaced apart by a distance X (as shown in FIG. 1).

Movement of the pilot's head towards the combiner causes sensor 10 to be triggered first followed shortly after by sensor 9. The sensors are coupled to a computer 26 which uses the relative trigger times of the sensors, and the sensor spacing X, to compute the velocity at which the pilot's head is travelling towards the combiner. The computer 26 is programmed with a threshold velocity which represents a velocity indicative of an impending collision between the pilot's head and the combiner.

The head-up display is also provided with a second sensor arrangement 11 which is positioned directly above the normal position of the pilot's head. This sensor arrangement comprises a second pair of infra-red optical proximity sensors which are arranged to detect when the pilot's head is outside a "normal" position. This normal position may for example be a fixed linear distance behind and in front of a point above the pilot's chair. The sensor arrangement 11 is coupled to the computer 26. The computer is also coupled to an accelerometer 29 arranged to provide a measure of any deceleration which the aircraft undergoes. This accelerometer may be a part of the plane's inertial navigation system or may be independent thereof.

If the sensor arrangement 11 indicates that the pilot's head is outside the normal position and the sensors 9 and 10 indicate an impending impact between the pilot's head and the combiner, or if, the aircraft is determined to be undergoing a deceleration in excess of a threshold value, the retraction mechanism 7 is operated by the computer 26 to cause the combiner 5 to rotate about the longitudinal axis of the arm 6 to a position at which collision is avoided. However, if none of these conditions is satisfied the retraction mechanism 7 will not be operated by the computer 26.

FIG. 2 shows a logic circuit illustrating the conditional function of this operation. False alarms due, for example, to other objects moving across the paths of sensors 9 and 10 or to a planned deceleration will not cause the retraction mechanism to be operated in error. The system is designed such that the time between the pilot's head reaching the threshold velocity and the combiner achieving the retracted position is less than 50 mS.

FIGS. 3 to 6 show in more detail the retraction mechanism 7 of the HUD 4. The retraction mechanism 7 comprises an annular collar 13 having a central passageway for engaging an extension portion 12 of the arm 6. The collar 13 comprises two main components: a first body member 14, with a radially extending recess 15 of rectangular cross-section being provided adjacent to the cut-away section (the body member 14 is shown in FIGS. 3 and 5 with a semi-circular portion 16 cut-away for clarity); and a heel 27 which is substantially "L" shaped and which is arranged to be rigidly attached to an internal face of the body member 14 so that one leg of the heel 27 projects into the central passageway of the collar 13 when the collar is assembled.

The collar is coupled at one end to the arm extension portion 12 by bias means in the form of a cylindrical torsion spring 19 which acts to rotate the extension portion, and with it the arm 6 and the combiner 5, with respect to the collar.

The extension portion 12 is provided with a circumferentially extending recess 17 which has a first cross-sectional area over a first region and a second, narrower, cross-sectional area over a second region so as to provide a "U" shaped abutment surface 28 at the junction between the two regions. The recess 17 is arranged in use to receive the heel 27, with the width of the heel 27, in the direction of the longitudinal arm axis B—B (See FIG. 2), being such as to allow the heel to pass through the recess 17, from end to end. With the arm 6 rotated fully anti-clockwise, a side surface of the heel 27 abuts against a similarly oriented end surface of the recess 17. This position defines an end stop of the release mechanism. In order to prevent the torsion spring 19 from rotating the arm out of this position, a wedge pin 18 is inserted through the collar passageway 15 so that its "V" shaped lower end is inserted into a space between the side surface of the heel, opposite the surface engaging an end wall of the recess 17, and the abutment surface 28 of the recess. The lower end region of the wedge pin 18 is dimensioned so as to abut both the side wall of the heel 27 and the abutment surface 28 when a downward force is exerted on the wedge pin.

In order to achieve a fit of sufficient tightness to restrict relative movement of the combiner to a few microns, the V-shaped end of the wedge pin 18 tapers with a half cone angle of 20°, although an angle within the range 10° to 30° may be suitable. The side wall of the heel and the abutment surface 28 are arranged to lie in respective planes passing through the axis B—B so as to converge to a small extent towards the side walls of the wedge pin which they engage.

As can be seen from FIGS. 3 and 5, the upper end of the wedge-pin 18, where it exits from the collar passageway 15, sits within a cylindrical compression spring 20 which acts against a flange 21 attached to the wedge pin in a sense tending to force the wedge pin radially outward. A cam 22 is mounted above the upper end of the wedge-pin 18 and acts on its upper surface. In a first position (shown in FIG. 3), the cam maintains the end of the wedge pin 18 in the recess 17 against the action of the compression spring 20 such that the pin is wedged between the heel 27 and the abutment surface 28. Due to the divergence of the two pairs of abutment surfaces, the bottom of the wedge pin will not come into contact with the lower surface of the recess 17 and the force exerted by the cam 22 will act substantially only against the abutment surfaces. It will be apparent that in this first position the wedge pin 18 prevents the combiner arm 6 from rotating. The combiner 5 is therefore held rigidly in its normal operating position and vibration of the combiner 5 is minimised.

In a second position of the cam, obtained by rotating the cam in an anti-clockwise direction, the wedge pin is allowed to move radially outwards, exiting the recess 17 and allowing the torsion spring 19 to rotate the arm 6 and the combiner 5 in a clockwise direction until the arm is prevented from rotating further by means of a physical stop which may, for example, be provided on the outside of the retraction mechanism. The amount of rotation is sufficient to take the combiner out of the trajectory path of the pilot's head where it may be held by means of a detent arrangement (not shown in the Figures).

The cam 22 is rotated by means of a dc motor 30 which is in turn controlled by the computer 26 which receives input signals from the sensors 9 and 10, the sensor arrangement 11, and the accelerometer 29. The motor shaft is provided with a circular disk 24, on which are arranged angularly spaced markings, which in combination with an optical detector 25 provides an angular position detector. The detector conveys information to the computer for the purpose of providing closed loop control of the retraction mechanism.

Following operation of the retraction mechanism to rotate the combiner out of the trajectory path of the pilot's head, it is possible to retrieve the combiner by a single handed operation involving rotating the combiner in a clockwise direction about the axis of the arm 6. Retrieval of the combiner causes a microswitch to be activated whereby the computer is reset, causing the motor 30 to rotate the cam 22 to its high point to re-engage the wedge pin with the recess of the extension portion 12. Retrieval can be accomplished in a fraction of a second. No other physical reset operation is required. Once the pilot has retrieved the combiner to its normal operating position the head-up display is once more fully operational.

It will be apparent to the skilled man that various modifications may be made to the above described embodiment within the scope of the invention.

I claim:

1. A head-up display system comprising:
   a combiner for positioning in front of a pilot's head in-line with the pilot's normal line of sight and in a plane substantially transverse to said line of sight;
   sensor means for detecting motion of the pilot's head towards the combiner and for generating a trigger signal, prior to impact between the pilot's head and the combiner, if the velocity of said motion exceeds a threshold velocity, the sensor means including first and second sensors spaced apart from one another and positioned between the normal position of the pilot's head and the combiner and arranged to be sequentially activated by motion of the pilot's head toward the combiner, and means for calculating, from the time difference between the activation of the two sensors, the velocity of the pilot's head toward the combiner and generating said trigger signal if the calculated velocity exceeds the threshold velocity; and
   retraction means coupled to the sensor means for receiving therefrom said trigger signal and, in response to receipt of said trigger signal, for retracting the combiner out of the trajectory of the pilot's head prior to impact between the head and the combiner.

2. A system according to claim 1, wherein the sensor means further includes an arrangement for detecting movement of the pilot's head out of the position which it normally occupies, said trigger signal only being generated if both the pilot's head is detected as lying outside the normal position and the necessary threshold velocity condition is satisfied.

3. A system according to claim 1 wherein the sensor means further includes an accelerometer for detecting deceleration of the aircraft and the sensor means is operative if the aircraft decelerates at a rate in excess of a threshold value, and irrespective of generation of a trigger signal predicated on the calculated head velocity, to transmit a trigger signal to the retraction means to cause retraction of the combiner.

4. A system according to claim 1 wherein the retraction means comprises:
   an arm coupled to the combiner, the arm rotatably engaging a collar or collar portion fixed relative to the cockpit to enable the combiner to be rotated about the longitudinal axis of the arm;
   bias means acting in a sense tending to rotate the arm to cause said retraction of the combiner; and
   a releasable locking mechanism, responsive to said trigger signal, for retaining the arm and the attached combiner in the normal operating position against the action of the bias means.

5. A system according to claim 4, wherein the locking mechanism comprises a locking pin extending through the collar/collar portion to engage a catch in the arm to lock the arm and the combiner relative to the collar/collar portion and the cockpit and a release mechanism for raising the pin through the collar/collar portion to disengage the pin from the arm and to thereby allow the combiner to rotate under the action of the bias means.

6. A system according to claim 5, wherein the release mechanism comprises spring means acting on the locking pin in a sense tending to disengage it from the arm and a cam acting on an upper surface of the pin, wherein, in a first position, the cam counteracts the force of the spring means and maintains the pin in engagement with the arm and, in a second position, the cam means releases the pin allowing it to move upwards and to disengage from the arm.

* * * * *